(12) United States Patent
Hino et al.

(10) Patent No.: US 8,704,663 B2
(45) Date of Patent: Apr. 22, 2014

(54) WORK DIRECTION DETERMINING METHOD AND DEVICE, AND WORK PROVIDED WITH DIRECTION DETERMINING FUNCTION

(75) Inventors: Yoshiharu Hino, Otsu (JP); Akira Miyake, Suita (JP); Daisuke Kuroki, Hirakata (JP); Takuya Yamaguchi, Hitachinaka (JP); Yusuke Minemura, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 216 days.

(21) Appl. No.: 13/148,675

(22) PCT Filed: Mar. 24, 2010

(86) PCT No.: PCT/JP2010/055139
§ 371 (c)(1),
(2), (4) Date: Oct. 3, 2011

(87) PCT Pub. No.: WO2010/110348
PCT Pub. Date: Sep. 30, 2010

(65) Prior Publication Data
US 2012/0025986 A1    Feb. 2, 2012

(30) Foreign Application Priority Data

Mar. 25, 2009   (JP) ................. 2009-073246

(51) Int. Cl.
*G08B 13/14* (2006.01)
*H04Q 5/22* (2006.01)
*G08B 1/08* (2006.01)
*G01S 5/02* (2010.01)
*H04W 24/00* (2009.01)
*G06F 19/00* (2011.01)

(52) U.S. Cl.
USPC ................. 340/572.1; 340/10.1; 340/539.11; 342/420; 455/456.1; 700/245

(58) Field of Classification Search
USPC ............ 340/10.1, 10.3, 539.11, 568.1, 572.1; 342/420, 465; 455/456.1, 420; 700/245
See application file for complete search history.

(56) References Cited

U.S. PATENT DOCUMENTS 6,946,950 B1 *  9/2005  Ueno et al. .................... 340/10.1
7,310,045 B2 * 12/2007  Inui ............................. 340/572.1

(Continued)

FOREIGN PATENT DOCUMENTS

CN    101373510 A    2/2009
JP    5-120499 A    5/1993

(Continued)

*Primary Examiner* — Jennifer Mehmood
*Assistant Examiner* — Omar Casillashernandez
(74) *Attorney, Agent, or Firm* — Mattingly & Malur, PC

(57) ABSTRACT

A work direction determining device includes a passive tag type IC tag secured at a predetermined position on the front surface thereof. The IC tag includes a substrate, an IC module and an antenna coil disposed on the substrate in an offset manner. The device includes an antenna communicating with the IC tag, and a determination circuit. Where the work and the direction determining device are located at respective predetermined communication positions, communication is done between the antenna of the direction determining device and the antenna coil of the IC tag, and the magnitude of communication intensity during the communication is determined by the determination circuit to thereby determine a direction of the work.

5 Claims, 15 Drawing Sheets

(56) References Cited

U.S. PATENT DOCUMENTS

| | | | |
|---|---|---|---|
| 7,485,794 B2 * | 2/2009 | Koizumi | 84/601 |
| 7,944,356 B2 * | 5/2011 | Tuttle | 340/572.1 |
| 8,106,776 B2 * | 1/2012 | Bauchot et al. | 340/572.1 |
| 8,456,281 B2 * | 6/2013 | Nogami | 340/10.1 |
| 2003/0076239 A1 * | 4/2003 | Wenzel et al. | 340/825.49 |
| 2008/0003457 A1 * | 1/2008 | Endo | 428/692.1 |
| 2009/0050688 A1 | 2/2009 | Kon et al. | |
| 2011/0001621 A1 * | 1/2011 | Iwahashi | 340/572.7 |

FOREIGN PATENT DOCUMENTS

| | | | |
|---|---|---|---|
| JP | 7-187154 A | 7/1995 | |
| JP | 11-110507 A | 4/1999 | |
| JP | 2000-306047 A | 11/2000 | |
| JP | 2000-311227 A | 11/2000 | |
| JP | 3339381 B2 | 10/2002 | |
| JP | 2005-41607 A | 2/2005 | |
| JP | 2007-50992 A | 3/2007 | |
| WO | WO 2009072518 A1 * | 6/2009 | G01S 3/14 |

* cited by examiner

COMMUNICATION POSITION

FIG. 6
(a)
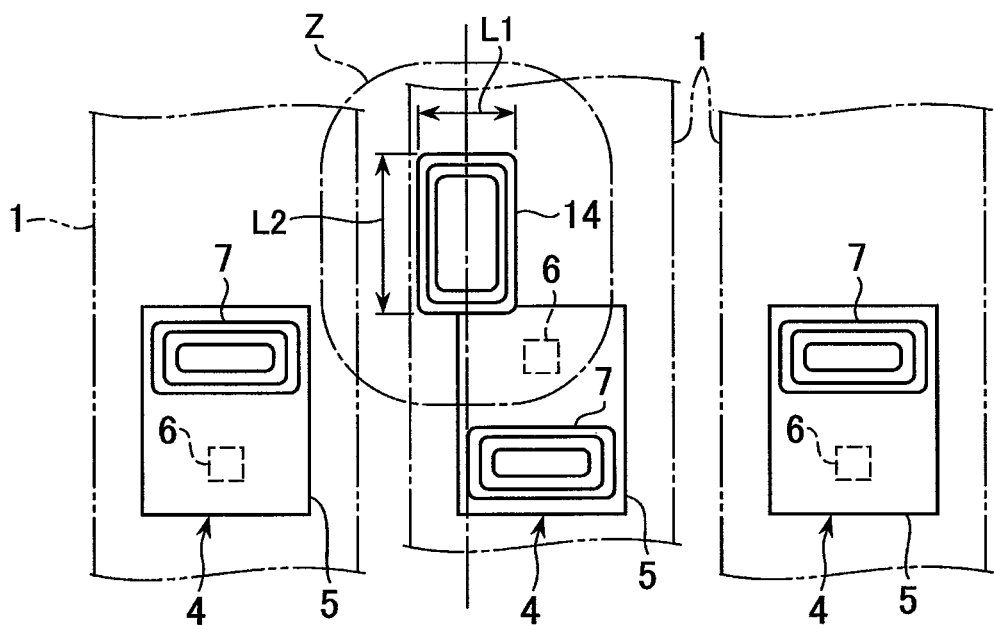
(b)
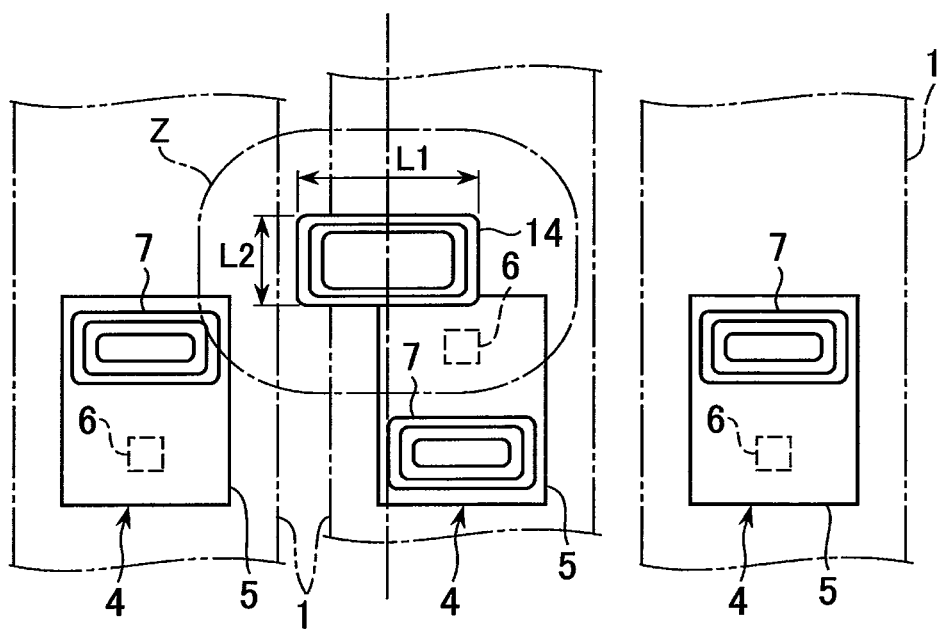

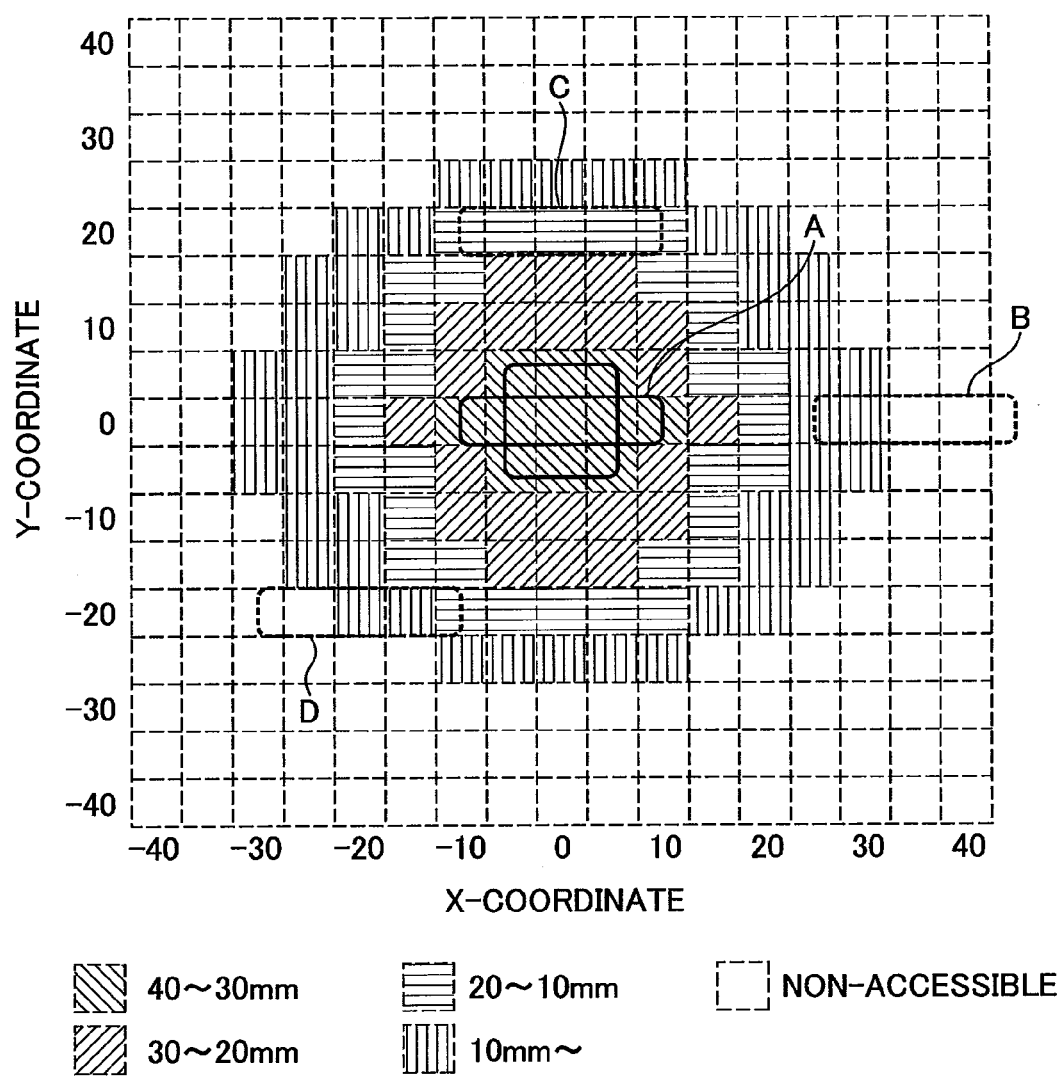

WORK DIRECTION DETERMINING METHOD AND DEVICE, AND WORK PROVIDED WITH DIRECTION DETERMINING FUNCTION

TECHNICAL FIELD

The present invention relates to a method and device for determining a direction of a work equipped with an IC tag, and to a work provided with a direction determining function.

BACKGROUND ART

Some proposals have been issued on a direction determining method of the present invention. For example, patent document 1 aims to determine a chip coil and intends to make it possible to specify the directions of terminal electrodes installed at left and right ends. The chip coil includes a glass ceramic substrate shaped in rectangle elongate right and left, a spiral coil formed on the front surface of the substrate, and a pair of the terminal electrodes each formed at a corresponding one of the left and right side portions of the substrate. An outer surface of a coil forming area is coated with polyimide. A need to determine a direction of the chip coil is based on the following reason. The terminal electrodes are comprised of a terminal electrode led from an outer end of the coil and a terminal electrode led from an inner end of the coil. These electrodes made to constantly assume a fixed posture are mounted on a circuit board. This intends to make constant the mode of generating magnetic flux in the mounted state.

The determination of the direction of the chip coil is done using the fact that a coil pattern is different between the front and rear of the substrate. Specifically, a centerline passing through the anteroposteriorly widthwise center of the substrate is assumed. Regions having the same area are assumed at respective targeted positions on the front side and rear side of the centerline. The coil patterns corresponding to the associated regions are optically read. The images thus read are subjected to binarization and the number of white pixels is obtained. Thus, the left-right direction of the chip coil is determined based on a difference in the number of the white pixels obtained.

The card processing system of patent document 2 aims to determine a non-contact type IC card equipped with a visible data display portion and is designed to determine whether or not the IC card is loaded thereto in such a manner that the front and back thereof is correct or whether or not the loading direction of the start-end of the IC card is correct. The IC card is configured such that an IC memory and an antenna are assembled into a card main body and a data display portion comprised of a rewritable heat-sensitive layer is provided on the front surface of the card main body. A mark for direction determination is provided on the rear surface of the card main body. The determination mark is formed of print display, a bar code, an optical code, a hole, a notch or the like. Such a mark is detected by an identifying sensor provided in the card processing system to determine whether or not the loading direction of the IC card is correct.

Incidentally, even if the IC card is loaded with the front and back thereof inverted or the loading direction of the start-end of the IC card is reversed, the card processing system can read and write the data of the IC chip. However, unless the IC card is loaded into the card processing system in the state where the data display portion is faced up and in the state where the loading direction of the start-end is correct, the display contents of the data display portion cannot be rewritten correctly. Because of this, the direction of the IC card is determined as described above.

A cartridge memory equipped with a direction determination identifier similar to that of the above-mentioned IC card can be seen in patent document 3. In the cartridge memory of patent document 3, an identifier corresponding to the above-mentioned determination mark is configured as follows. An IC chip and a loop antenna are assembled into a rectangular substrate, with the IC chip being disposed to one end of the substrate in the longitudinal direction. The front surface of the IC chip is coated with a black resin material. In operation, the cartridge memory is conveyed toward an automatic assembling apparatus along a linear conveyance path. During the conveyance, the presence or absence of the above-mentioned identifier is detected by an infrared sensor to thereby determine whether or not the conveyance posture of the cartridge memory is correct. If the cartridge memory does not assume a correct conveyance posture, the cartridge memory is sprayed with air jetted from an air nozzle and is rejected from the conveyance path.

PRIOR ART REFERENCES

Patent Documents

Patent Document 1: Japanese Patent No. 3339381 (Paragraph No. 0013 to 0014, FIG. 1)
Patent Document 2: JP-2000-311227-A (Paragraph No. 0025, FIG. 1)
Patent Document 3: JP-2005-041607-A (Paragraph No. 0015, FIG. 2)

SUMMARY OF THE INVENTION

Problems to be Solved by the Invention

The direction determining method of patent document 1 involves optically reading the coil patterns in the preset regions, binarizing the images and determining the direction of the chip coil based on a difference in the number of white pixels obtained. Therefore, the chip coil can be reduced in cost according to the omission of an identifier such as a determination mark. In addition, it is possible to avoid a characteristic change of the chip coil during the production process along with the provision of the identifier. However, an imaging device, an image processing means or the like is essential for direction determination. Therefore, there is no problem if the direction determination is done in a manufacturing setting; however, this method is not suitable for direction determination in a user-level. It is assumed that the coil patterns and a background can clearly be discriminated therebetween. Therefore, if the coil patterns and the background are not clear in contrast because of the same color tone, determination accuracy extremely lowers. Thus, this method cannot be applied.

The direction determining methods of patent documents 2 and 3 involve detecting the determination mark and the identifier, respectively, by use of the corresponding sensors to determine whether or not the direction is correct. Therefore, these methods can determine the direction more readily than the method using the imaging device and the image processing means described earlier. Thus, the direction determination may be possible in a user-level. However, if a determination target is one to be used repeatedly, there is a possibility that the determination mark or identifier may get dirty to be degraded, the direction determination cannot therefore be done accurately. For example, if the identifier is formed of the bar code, there is a possibility that the bar code may partially be damaged or foreign matter attaches to the bar code, it therefore becomes impossible to read the bar code. To avoid such situations, maintenance has to be done to prevent that the determination mark or identifier get dirty to be degraded, which requires additional work.

It is an object of the present invention to provide a direction determining method and device that can determine a direction of the work without the necessity of the provision of a determination mark, an identifier or the like, and without the necessity of additional preparation of identifying means such as a sensor, an imaging device or the like, and a work provided with a direction determining function.

It is another object of the present invention to provide a direction determining method and device that are suitable for a work to be used repeatedly, and a work provided with a direction determining function.

It is another object of the present invention to make it possible to perform direction determination with a high degree of reliability using a communication function of a work provided with a non-contact IC tag without any change, and to thus perform direction determination on the work accurately while reducing equipment cost for the direction determination compared with that of the conventional direction determining methods.

Means for Solving Problems

A direction determining method of the present invention aims to determine a work 1 having a passive tag type IC tag 4 secured at a predetermined position on the front surface thereof, the method allowing a direction determining device 11 to determine a direction of the work 1. The IC tag 4 includes a substrate 5, an IC module 6 and an antenna coil 7, the IC module 6 and the antenna coil 7 being disposed on the substrate 5 adjacently to each other. The direction determining device 11 includes an antenna 14 communicating with the IC tag 4, and a determination circuit 15. This method is characterized by the following. In a state where the work 1 and the direction determining device 11 are located at respective predetermined communication positions, communication is performed between the antenna 14 of the direction determining device 11 and the antenna coil 7 of the IC tag 4, and the magnitude of communication intensity during the communication is determined by the determination circuit 15 to thereby determine a direction of the work 1.

If the work 1 located at the predetermined communication position assumes a normal posture, the antenna coil 7 installed on the IC tag 4 is located inside a communicable zone Z of the antenna 14 of the direction determining device 11. If the work 1 located at the predetermined position assumes a reverse posture, the antenna coil 7 installed on the IC tag 4 is located outside the communicable zone Z of the antenna 14 of the direction determining device 11. In this way, the presence or absence of the communication intensity, during the communication, of the work 1 at the time of assuming the normal posture and of assuming the reverse posture is determined by the determination circuit 15 to thereby determine a direction of the work 1.

The direction determining device 11 is configured by attaching the determination circuit 15 to a tag reader. Communication is performed between the antenna 14 of the tag reader and the antenna coil 7 of the IC tag 4, and the magnitude of communication intensity during the communication is determined by the determination circuit 15 to thereby determine a direction of the work 1.

A group of the works 1, assuming a uniform posture, disposed adjacently to each other at predetermined intervals is transferred in one direction toward the direction determining device 11 installed at a predetermined position. In this way, each time the work 1 reaches the predetermined communication position, communication is performed between the direction determining device 11 and the IC tag 4 provided on the work 1 to continuously perform direction determination on the works 1.

A work direction determining device of the present invention aims to determine a work 1 having a passive tag type IC tag 4 secured at a predetermined position on the front surface thereof, the device determining a direction of the work 1. The IC tag 4 includes a substrate 5, an IC module 6 and an antenna coil 7, the IC module 6 and the antenna coil 7 being disposed on the substrate 5 adjacently to each other. The direction determining device 11 includes an antenna 14 adapted to perform communication with the IC tag 4 via the antenna coil 7 and a determination circuit 15 determining the magnitude of communication intensity during the communication. In a state where the work 1 and the direction determining device 11 are located at respective predetermined communication positions, communication is performed between the antenna 14 of the direction determining device 11 and the antenna coil 7 of the IC tag 4, and the magnitude of the communication intensity during the communication is determined by the determination circuit 15 to thereby determine a direction of the work 1.

In a state where the work 1 kept to assume a normal posture and the direction determining device 11 are located at the respective predetermined communication positions, the antenna 14 is disposed in such a manner that a communicable zone Z of the antenna 14 of the direction determining device 11 partially overlaps only an installation area of the antenna coil 7 provided on the IC tag 4.

The direction determining device 11 is comprised of a tag reader equipped with the determination circuit 15 determining the magnitude of communication intensity.

A demagnetizing body 18 made of a magnetic material and reducing a leakage magnetic flux of the antenna 14 is disposed adjacently to the antenna 14 of the direction determining device 11.

A work according to the present invention communicates with a direction determining device 11 at a predetermined communication position and is determined by the direction determining device 11 as to whether to assume a normal posture or a reverse posture. The direction determining device 11 includes an antenna 14 communicating with an IC tag 4 and a determination circuit 15 determining the magnitude of communication intensity during the communication. The IC tag 4 capable of communicating with the direction determining device 11 is secured to the front surface of the work 1 at a predetermined position. The IC tag 4 is configured as a passive tag type including a substrate 5, an IC module 6 and an antenna coil 7, the IC module 6 and the antenna coil 7 being disposed on the substrate 5 adjacently to each other. The antenna coil 7 may be disposed on the substrate 5 in an offset manner so that a communication distance between the antenna coil 7 and a communicable zone Z of the antenna 14 of the direction determining device 11 is different in magnitude on the basis of a difference in the posture of the work 1 located at the predetermined communication position.

The antenna coil 7 is disposed on one side of the substrate 5 in an offset manner so that the whole of the antenna coil 7 installed on the IC tag 4 may be located inside the communicable zone Z of the antenna 14 of the direction determining device 11 only when the work 1 located at the predetermined communication position assumes a normal posture.

An arrangement pattern of the antenna coil 7 installed on the IC tag 4 is formed in a non-rectangle. The antenna coil 7 is disposed on the substrate 5 so that an overlapping area between the communicable zone Z of the antenna 14 of the direction determining device 11 and the antenna coil 7 may be different in magnitude between when the work 1 located at the predetermined communication position assumes a normal posture and when assumes a reverse posture.

A demagnetizing body 18 made of a magnetic material and reducing a leakage magnetic flux of the antenna 14 is disposed adjacently to the antenna coil 7 of the IC tag 4.

In the work 1 shaped in a rectangular parallelepiped and provided with two compartments 2, 2, respective mouths 3, 3 for the compartments 2, 2 are opened in an upper surface of the work 1 at anteroposteriorly symmetrical positions and the IC tag 4 is disposed between both the mouths 3, 3. The antenna coil 7 is disposed in an offset manner on one of front and rear sides of the substrate 5 constituting the IC tag 4, and the IC module 6 is disposed on the other side.

Effect of the Invention

In the present invention, at a predetermined communication position, communication is performed between the antenna 14 of the direction determining device 11 and the antenna coil 7 of the IC tag 4 installed on the work 1 side. In addition, the magnitude of the communication intensity during the communication is determined by the determination circuit 15 to thereby determine a direction of the work 1. In this way, the direction of the work 1 can be determined without the necessity of the provision of a determination mark, an identifier or the like on the work 1 and further without the necessity of the additional preparation of identifying means such as a sensor, an imaging device or the like, which are essential for the conventional determining methods. In other words, direction determination is performed using the communication function of the non-contact type IC tag 4 provided on the work 1 as it is. Therefore, the equipment cost for the direction determination can be reduced and additionally the cost for the work 1 can be reduced. Further, there is no concern about dirtiness or degradation that the identifier such as a bar code or the like cannot avoid. In particular, if a work used repeatedly is a determination object, the direction determination can be performed with a high degree of reliability for long periods. There is also a merit in which the direction determination can be performed without being affected by the shape, color of the front surface, pattern, etc. of the work 1.

The direction determination of the work 1 is basically performed by the determination circuit 15 determining the magnitude of communication intensity. However, the direction of the work 1 may be determined by the determination circuit 15 determining whether the antenna coil 7 installed in the IC tag 4 is inside of or outside of the communicable zone Z of the antenna 14 of the direction determining device 11, i.e., determining the presence or absence of the communication intensity. In such a case, the determination result can be made clearer, the direction determination can therefore be done further accurately. Thus, the reliability of the determination result can be improved.

If the direction determining device 11 is configured by using the tag reader, i.e., by attaching the determination circuit 15 to the tag reader, the cost of the direction determining device 11 can be reduced according to the use of the existing tag reader. Further, the structure of the device is simple; therefore, the direction determination can be done without any difficulty in the case where the direction determination is performed not only during a manufacturing process but in a user-level. If it is made possible that such direction determination is continuously done while a group of the works 1 is transferred in a one direction, the direction determination can be done efficiently without a time loss.

If the demagnetizing body 18 is disposed adjacently to the antenna 14 of the direction determining device 11, the leakage magnetic flux of the antenna 14 can be absorbed and reduced by the demagnetizing body 18 to appropriately deform the communicable zone Z of the antenna 14. Therefore, the communicable zone Z is deformed in a direction away from the antenna coil 7 encountered when the work 1 assumes the reverse posture to bring the antenna 14 and the antenna coil 7 closer to each other for reliable communication. Also in the case where the demagnetizing body 18 is disposed on the IC tag 4 side, the function and effect can be displayed.

The work 1 is provided with the IC tag 4 whose antenna coil 7 is disposed at a position offset with respect to the substrate 5. In addition, the work 1 is such that the communication intensity between the direction determining device 11 and the IC tag 4 is made different in magnitude between when the work assumes the normal posture and when the reverse posture. With such a work 1, the direction determination can be done based on the difference in the communication intensity by using the communication function of the IC tag 4 as it is. Therefore, it is not necessary to additionally install a determination mark, an identifier or the like. Thus, the cost of the work 1 can be reduced accordingly. In addition, also equipment cost for the direction determination can be reduced. For example, there is no concern about dirtiness or degradation that the identifier such as a bar code or the like cannot avoid. Also in the case where the work 1 used repeatedly is a determination object, the direction determination can be performed with a high degree of reliability for long periods.

The whole of the antenna coil 7 is made to be located inside the communicable zone Z of the antenna 14 of the direction determination device 11 only when the work 1 assumes the normal posture. In such a case, the communication intensity is clearly different between when the work 1 assumes the normal posture and when the reverse posture. Therefore, the determination result obtained by the determination circuit 15 can be made more clearly, the direction determination can therefore be done further accurately, thereby enhancing the reliability of the determination result.

The overlapping area between the communicable zone Z of the antenna 14 and the antenna coil 7 is made different in magnitude between when the work 1 assumes the normal posture and when the reverse posture. In such a case, it is found that the work 1 is at a predetermined communication position regardless of the posture of the work 1. In this way, if the works 1 are supplied continuously, for example, it can be determined that the supply is interrupted and that a foreign work not provided with an IC tag 4 is mixed although having a similar shape. Since the arrangement pattern of the antenna coil 7 is formed in a non-rectangle, the degree of freedom of the arrangement position of the antenna coil 7 with respect to the substrate 5 can be increased. Therefore, the IC tag 4 accommodating the difference in the size and shape of the work 1 can be applicable with ease.

The work 1 shaped like a reservoir is provided with the mouths 3, 3 opened in the upper surface thereof at anteroposteriorly symmetrical positions. In addition, the work 1 is such that the antenna coil 7 is disposed in an offset manner on one of front and rear sides of the substrate 5 disposed between both the mouths 3, 3. In this way, a distance-difference between the direction determining device 11 and the antenna coil 7 can be increased between when the work 1 assumes the normal posture and when the reverse posture. In other words, the communication intensity can clearly be made different between when the work 1 assumes the normal posture and when the reverse posture. Therefore, the determination result by the determination circuit 15 can be made clearer, thereby allowing for accurate direction determination. The anteroposterior mouths 3, 3 are physically isolated from each other by means of the IC tag 4. Therefore, it is possible to prevent a splashing reagent solution from mixing into the adjacent mouth 3 during the filling of liquid or the like.

BRIEF DESCRIPTION OF THE DRAWINGS

FIGS. 6(a) and 6(b) are plan views illustrating a communicable area based on a difference in antenna arrangement shape encountered when a work positionally deviates.

FIG. 18 is a plan view illustrating test formation of test example 5.

MODE FOR CARRYING OUT THE INVENTION

[Embodiments]

Figure 1:
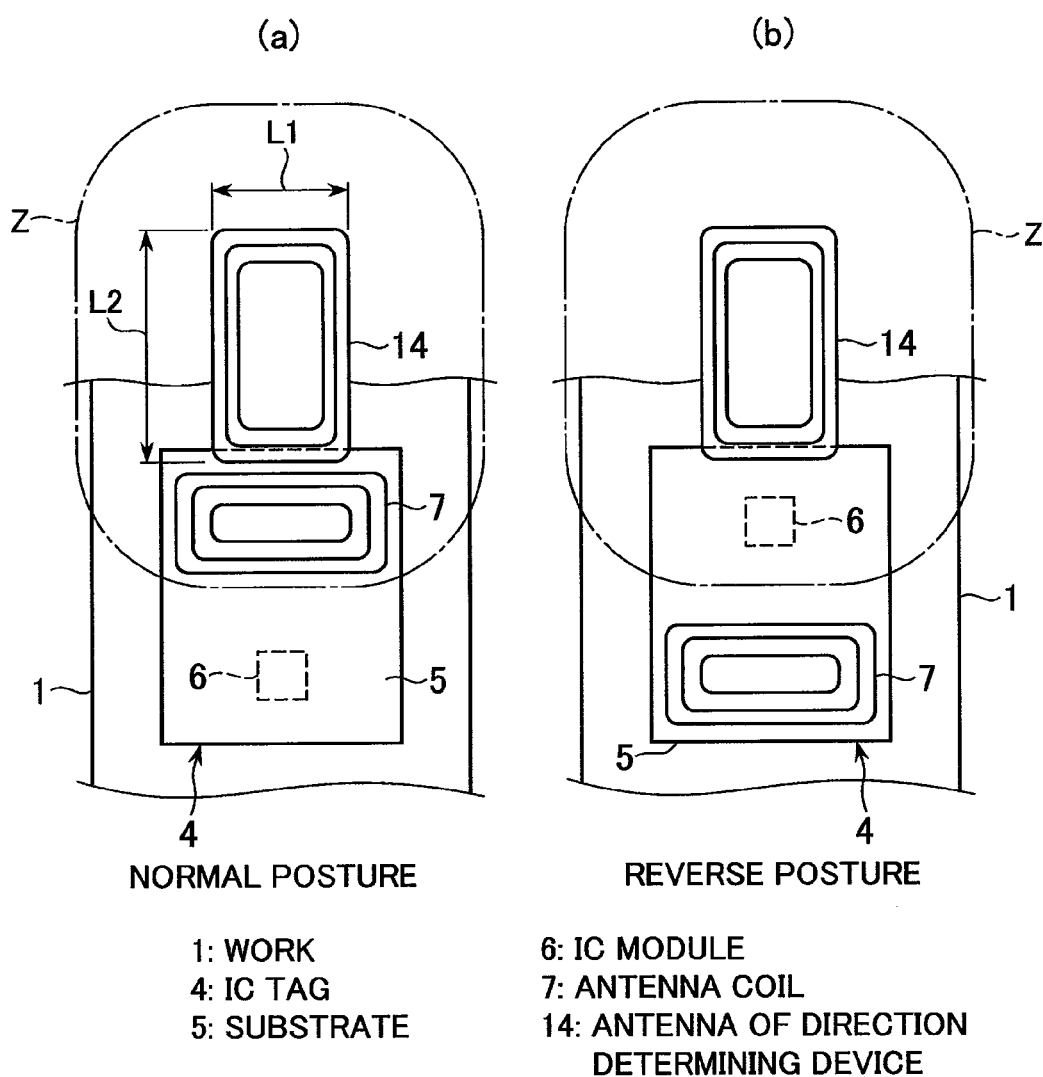
FIGS. 1(a) and 1(b) are plan views illustrating a positional relationship between a direction determining device and an IC tag provided on a work.
Figure 2:
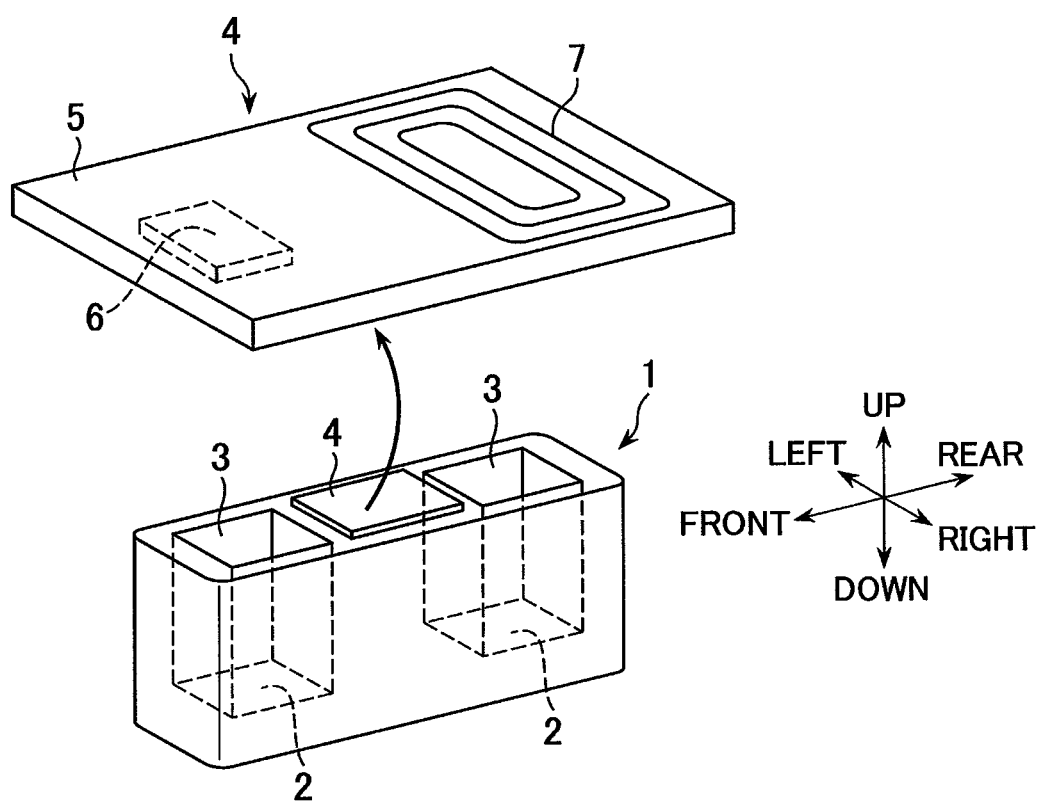
FIG. 2 is a perspective view illustrating an example of a work provided with a direction determining function.

FIGS. 1 to 6 illustrate an embodiment of a direction determining method and device, and a work subjected to direction determination according to the present invention. Incidentally, in the following embodiment, the directions specified by the indications of crossing arrows, front and rear or back, left and right, and upside and downside in FIG. 2 are used to explain a back and forth direction, a left-right direction and an up-down direction for convenience of the explanation.

As illustrated in FIG. 2, a work 1 is a rectangular parallelepiped reservoir formed of plastic. The reservoir is provided therein with a pair of front and rear compartments 2, 2. The compartments 2, 2 are provided in the upper surface of the work 1 with mouths 3, 3 opening at anteroposteriorly symmetrical positions. An IC tag 4 exhibiting a direction determining function is fixedly adhered to an anteroposteriorly central portion between both the mouths 3, 3. The IC tag 4 is of a passive tag type and includes a substrate 5, an IC module 6 buried in the front wall of the substrate 5, and an antenna coil 7 eccentrically disposed close to the rear portion of the substrate 5. A unique number (management number) of the work 1 is recorded in the IC module 6. When the direction determining device 11 to be described later determines the direction of the work 1, an entry is checked against a database and the entry matched with use conditions are written in the database. For example, a date when a test is performed, test contents, a name of a person conducting the test are written in the database.

Different kinds of test liquids or specimen liquids are filled in the corresponding compartments 2, 2 of the work 1 in predetermined amounts. The external appearance of the work 1 in this state is anteroposteriorly symmetrical. Therefore, even if a work 1 in the state where its front and back are correct (hereinafter, simply called the normal posture) and a work 1 in the state where its front and back are reversed (hereinafter, simply called the reverse posture) are mixed, their states cannot be determined based on their external appearances. To avoid such confusion, a state where the antenna coil 7 is located on the upper surface rear side of the work 1 (the state shown in FIG. 2) is defined as a normal posture. The work 1 assuming the reversed posture is prevented from being transferred to a filling position of a test liquid or specimen liquid.

Figure 3:
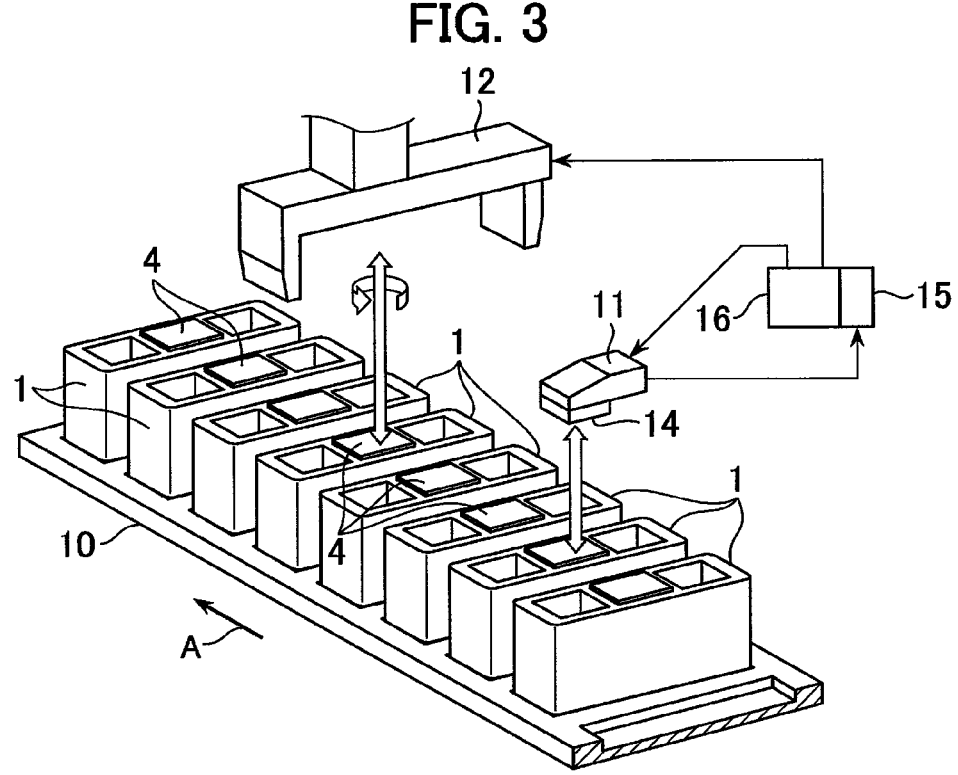
FIG. 3 is a perspective view of an outline of a direction determining procedure.
Figure 4:
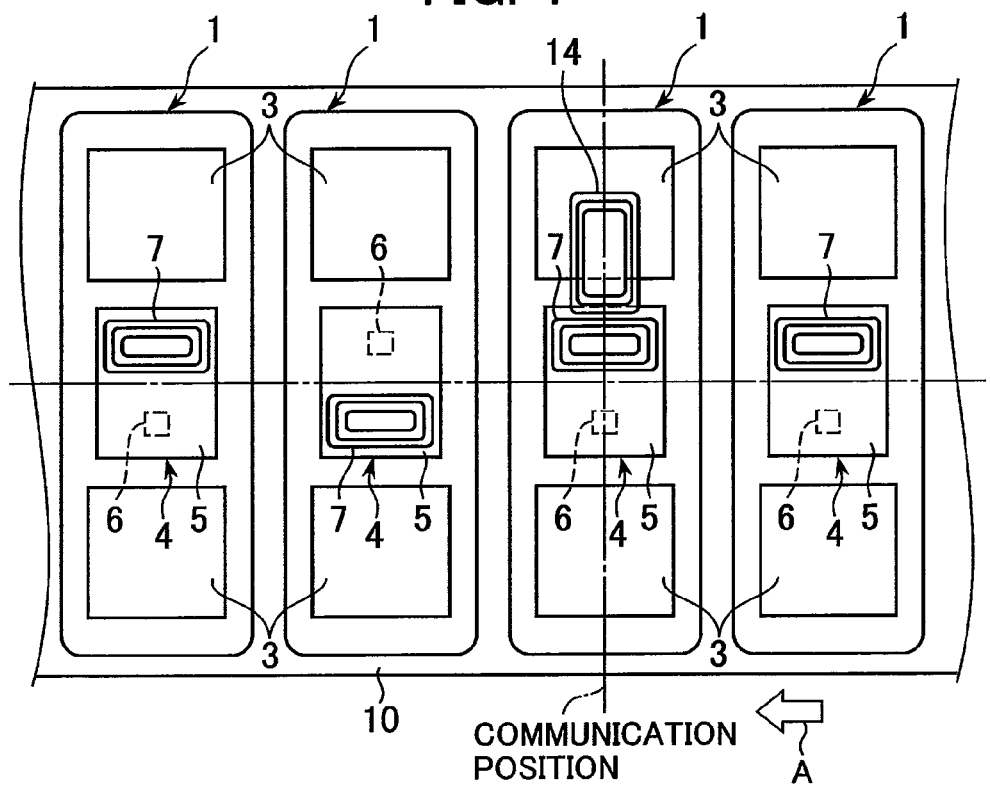
FIG. 4 is a plan view illustrating a positional relationship between the direction determining device and the IC tag encountered when they communicate with each other.
Figure 5:
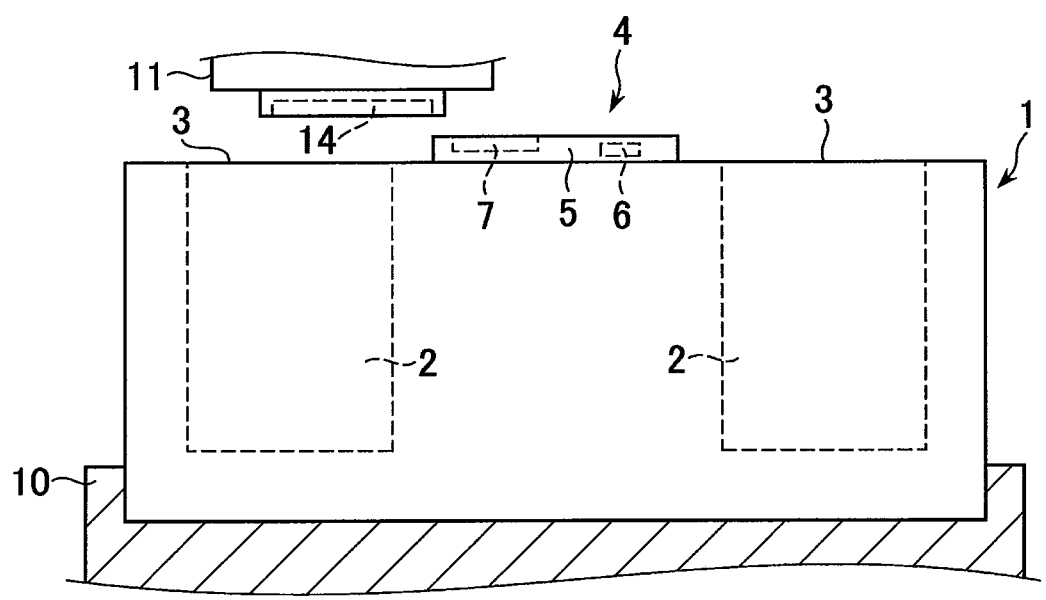
FIG. 5 is a lateral view illustrating the positional relationship between the direction determining device and the IC tag encountered when they communicate with each other.

The works 1 where the compartments 2, 2 are filled with test liquid or specimen liquid are put on a transfer device 10 in the state where the works 1 are slightly spaced apart from each other and are adjacent from each other as illustrated in FIG. 3. The works are intermittently transferred toward a direction determining device 11 disposed on one side of the transfer device 10 as indicated with arrow A. A posture changing device 12 is installed on the downstream side, in the transfer direction, of the direction determining device 11. The posture changing device 12 is used to return to a normal posture a work 1 that is determined by the direction determining device 11 to assume a reverse posture. The compartments 2 of the work 1 arranged to assume the normal posture are filled with the test liquid or specimen liquid by a filling instrument (not illustrated) installed on the downstream side, in the transfer direction, of the posture changing device 12. Thereafter, such a work 1 is discharged from the transfer device 10. Incidentally, the works 1 having been used are washed and repeatedly used.

The direction determining device 11 is comprised of a tag reader capable of reading or writing the entries of the IC tag 4. The tag reader includes a spiral antenna 14 adapted to communicate with the IC tag 4 and a controller 16 including a determination circuit 15 that determines the magnitude of communication intensity during communication. As illustrated in FIG. 3, when the work 1 reaches a communication position immediately below the direction determining device 11, a sensor not shown detects it and sends a detection signal to the controller 16. The direction determining device 11 is lowered to bring the antenna 14 close to the antenna coil 7 of the IC tag 4, whereby communication is established therebetween.

Specifically, a carrier wave containing data outputted from the controller 16 is outputted from the antenna 14 and is received by the antenna coil 7 of the IC tag 4. The IC tag 4 having received the carrier wave sends back the unique number having previously been recorded on the IC module 6 to the antenna 14 via a reflective wave. In this case, the determination circuit 15 determines the magnitude of the communication intensity (the communication intensity of the reflective wave sent back) between the direction determining device 11 and the IC tag 4 or the presence or absence of the communication intensity. In this way, the work 1 can be found to assume the normal posture or the reverse posture.

As described earlier, the antenna coil 7 of the IC tag 4 encountered when the work 1 assumes the normal posture is disposed eccentrically close to the rear portion of the substrate 5. Therefore, the antenna coil 7 encountered when the work 1 assumes the normal posture is located inside a communicable zone Z of the antenna 14 of the direction determining device 11 as indicated with an imaginary line in FIG. 1(a). Thus, such an antenna coil 7 can obtain appropriate communication intensity. However, the antenna coil 7 of the IC tag 4 encountered when the work 1 assumes the reverse posture is located at a position largely offset forwardly from immediately below the antenna 14 of the direction determining device 11, i.e., at a position outside the communicable zone Z of the antenna 14 as illustrated in FIG. 1(b). Therefore, the direction determining device 11 and the IC tag 4 come into a communication-impossible state and communication intensity thereby becomes almost equal to zero.

To make the communication intensity clearly different between the direction determining device 11 and the IC tag 4 only on the basis of the anteroposterior position of the antenna coil 7 on the IC tag 4 side, the IC tag 4 needs to be of an electromagnetic induction-passive tag type. The electromagnetic induction-passive tag type IC tag 4 has a characteristic in which a communicable distance is as extremely small as approximately several centimeters. This is because the antenna 14 of the direction determining device 11 and the antenna coil 7 of the IC tag 4 undergo inductive coupling to transmit an energy signal. Therefore, the IC tag 4 is configured as an electromagnetic induction type passive tag. Further, the antenna 14 of the direction determining device 11 is sufficiently brought into close to the IC tag 4 to reduce the covering area of a communicable carrier wave to a small level. Thus, the communication intensity can be made clearly different depending on the anteroposterior position of the antenna coil 7. The distance in the vertical direction between the antenna 14 and the antenna coil 7 is preferably 0 to 50 mm although depending on the intensity of the electromagnetic wave sent from the antenna 14. Incidentally, an electromagnetic wave type active tag-type IC tag has a communicable distance of as long as several meters. Therefore, it is extremely difficult to make the communication intensity clearly different only on the basis of the anteroposteriorly positional difference of the antenna coil 7.

As illustrated in FIG. 6(a), in the state where a work 1 is transferred to a predetermined communication position, the work 1 may slightly be offset from a predetermined communication position and its posture may be a reverse posture. In such a case, the antenna coil 7 of the IC tag 4 of an adjacent work 1 may probably enter the communicable zone Z of the antenna 14 of the direction determining device 11. If the communication intensity in such a case is sufficiently small, there is no problem. However, if the communication intensity is such magnitude as to slightly exceed a threshold value set in the determination circuit 15, it cannot be specified that the posture of the work 1 which is a real communication partner is the reverse posture.

To deal with such a situation, a left-right width L1 of the coil of the antenna 14 of the direction determining device 11 is made smaller than an anteroposterior width L2 thereof to limit the left-right width of the communicable zone Z of the antenna 14. Incidentally, as illustrated in FIG. 6(b), if the left-right width of the coil of the antenna 14 is greater than the anteroposterior width thereof, the left-right width of the communicable zone Z of the antenna 14 is increased. Therefore, if the work 1 is slightly offset from the predetermined communication position, it becomes possible for the direction determining device 11 to communicate with the IC tag 4 of an adjacent work 1.

According to the direction determining device of the present invention configured as above, it is possible to accurately know as to whether or not the work 1 is transferred in the normal posture only by determining whether or not communication is possible between the IC tag 4 disposed at the center of the upper surface of the work 1 and the direction determining device 11. Unlike the conventional direction determining method, it is not necessary to additionally provide a determination mark, an identifier or the like on the work 1; therefore, the work 1 can be provided at low cost. In addition, the direction determining device 11 can be provided by adding the determination circuit 15 to an existing tag reader without the necessity of additional preparation of identifying means such as a sensor, an imaging device or the like. Therefore, equipment cost for direction determination can be reduced. Further, the communication function of the work 1 equipped with a non-contact type IC tag can be used as it is to perform direction determination with a high degree of reliability.

Hereinafter, shown are other embodiments of arrangement patterns of the antenna coil 7 in the IC tag 4 and of arrangement formations of the antenna 14 of the direction determining device 11 adapted to the respective arrangement patterns. In the following embodiments, only portions different from those in the previous embodiment are described. In addition, the same members as those of the previous embodiment are denoted with like reference numerals and their explanations are omitted.

Figure 7:
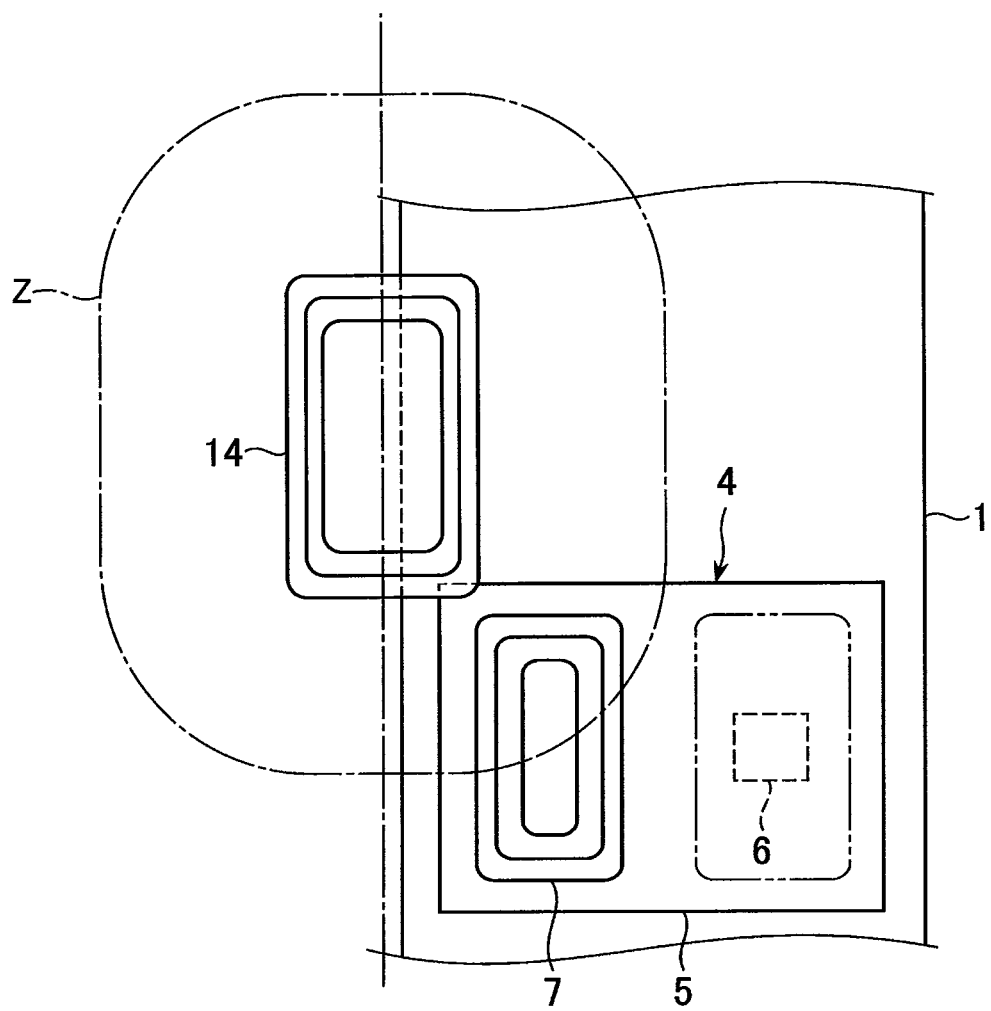
FIG. 7 is a plan view illustrating another embodiment of an IC tag side antenna coil.

Referring to FIG. 7, an IC tag 4 is disposed at the anteroposterior center of the upper wall of a work 1. In addition, an antenna coil 7 and an IC module 6 are disposed in the left-half portion and right-half portion, respectively, of a left-right-landscape-oriented substrate 5. This state is a normal posture of the work 1. If the work 1 assumes a reverse posture, the antenna coil 7 is located in the right-half portion of the substrate 5. If the work 1 assuming the normal posture is at a predetermined communication position, the central position of an antenna 14 of a direction determining device 11 is close to the left-side portion of the work 1. Thus, only the rear half side of the antenna coil 7 overlaps a communicable zone Z. In the state where the work 1 assumes the reverse posture, the antenna coil 7 is outside the communicable zone Z as illustrated with an imaginary line and communication is thereby impossible.

Figure 8:
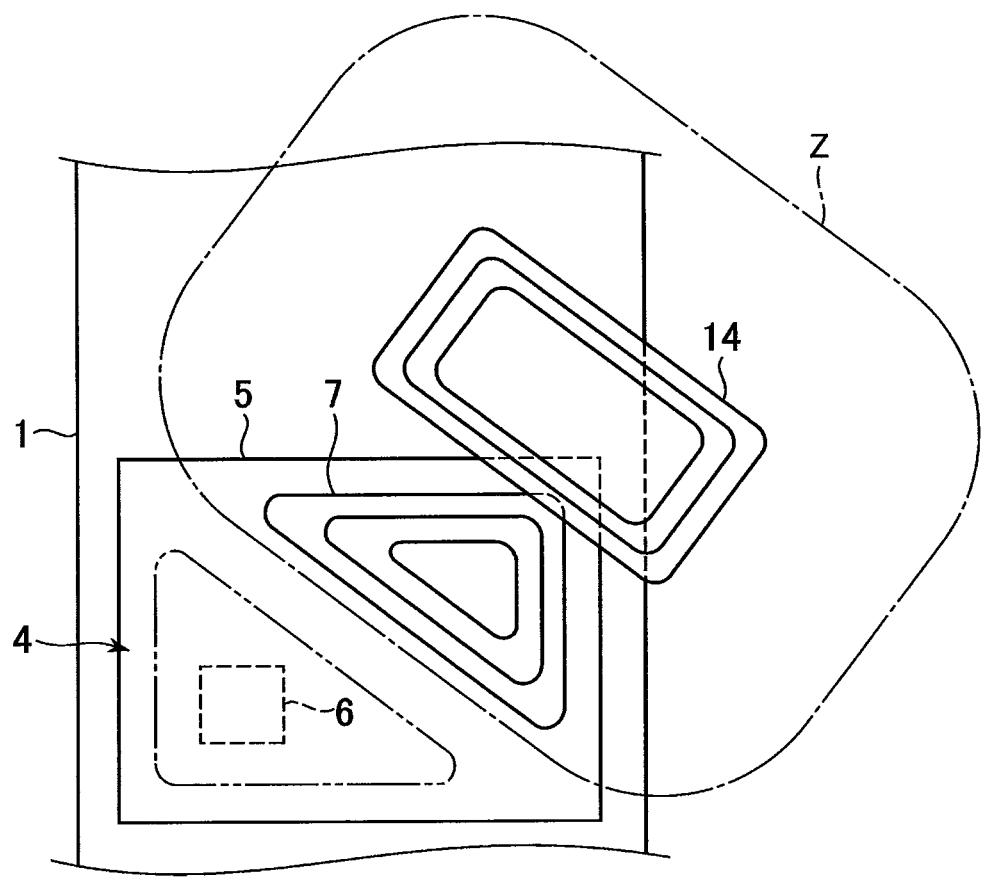
FIG. 8 is a plan view illustrating further another embodiment of the IC tag side antenna coil.

Referring to FIG. 8, an IC tag 4 is disposed at the anteroposterior center of the upper wall of a work 1. In addition, a triangular antenna coil 7 and an IC module 6 are disposed at a rear corner of a right-half portion and a front corner side of a left-half portion, respectively, of a left-right-landscape-oriented substrate 5. In this state the work 1 assumes the normal posture. If the work 1 assumes the reverse posture, the antenna coil 7 is located at the front corner side of the left-half portion of the substrate 5. Since the antenna coil 7 is formed triangular, an antenna 14 of a direction determining device 11 is arranged slantwise such that its long side portion is parallel to the bottom portion of the triangular antenna coil 7. In the state where the work 1 assumes the normal posture at the predetermined communication position, the whole of the antenna coil 7 is located inside a communicable zone Z of the antenna 14. However, in the state where the work 1 assumes the reverse posture, the antenna coil 7 is outside the communicable zone Z as illustrated with an imaginary line and communication is thereby impossible.

Figure 9:
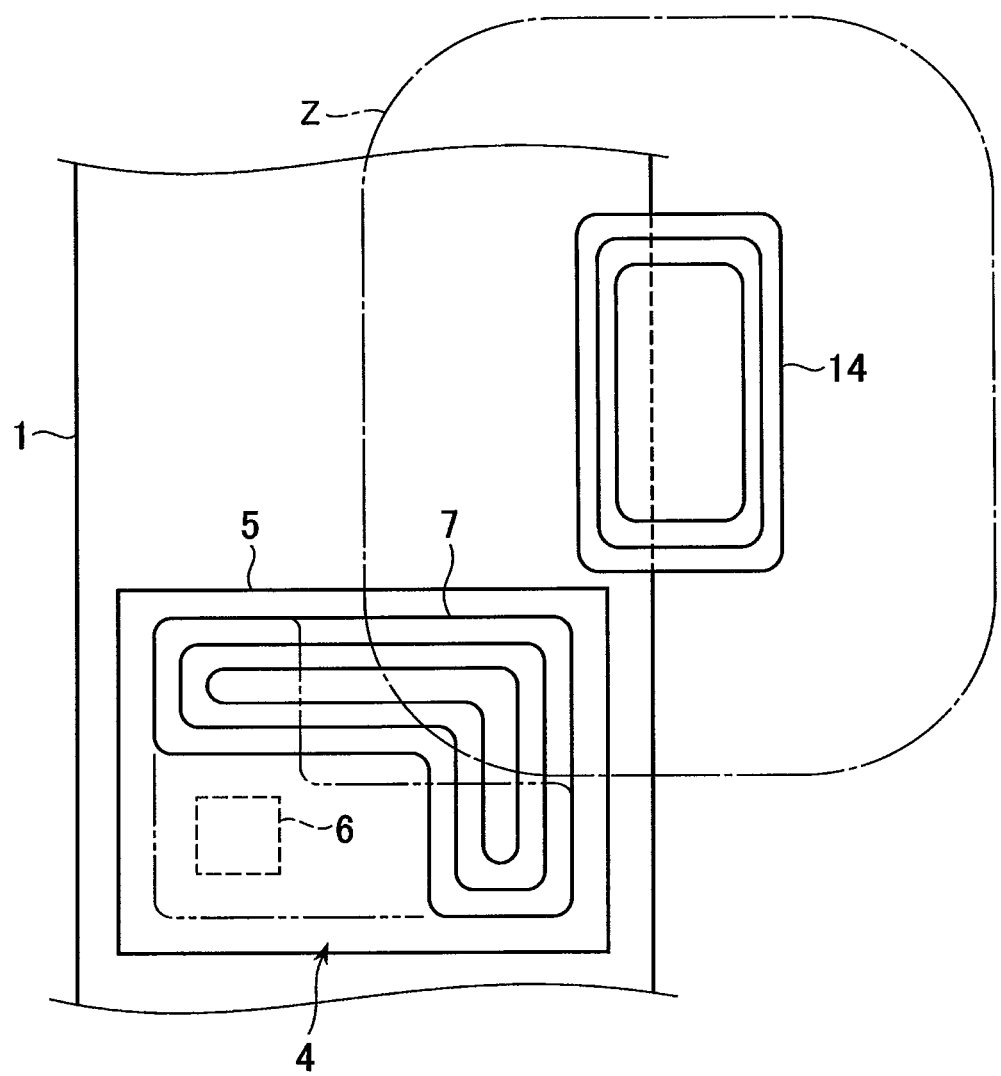
FIG. 9 is a plan view illustrating still another embodiment of the IC tag side antenna coil.

Referring to FIG. 9, an IC tag 4 is disposed at the anteroposterior center of the upper wall of a work 1. An inverse L-shaped area is ensured along the rear side portion and right side portion of a left-right-landscape-oriented substrate 5. In this area an antenna coil 7 is formed like an inverse L-shaped spiral and in the remaining area an IC module 6 is disposed. In this state the work 1 assumes the normal posture. In the case where the work 1 assumes the reverse posture, the antenna coil 7 occupies the L-shaped area along the front side portion and the left side portion as illustrated with an imaginary line. If the work 1 assuming the normal posture is at a predetermined communication position, the central position of an antenna 14 of a direction determining device 11 is located close to the right side portion of the work 1. In addition, only the rear right corner of the antenna coil 7 overlaps a communicable zone Z. In the state where the work 1 assumes the reverse posture, the antenna coil 7 is outside the communicable zone Z as illustrated with an imaginary line and communication is thereby impossible.

Figure 10:
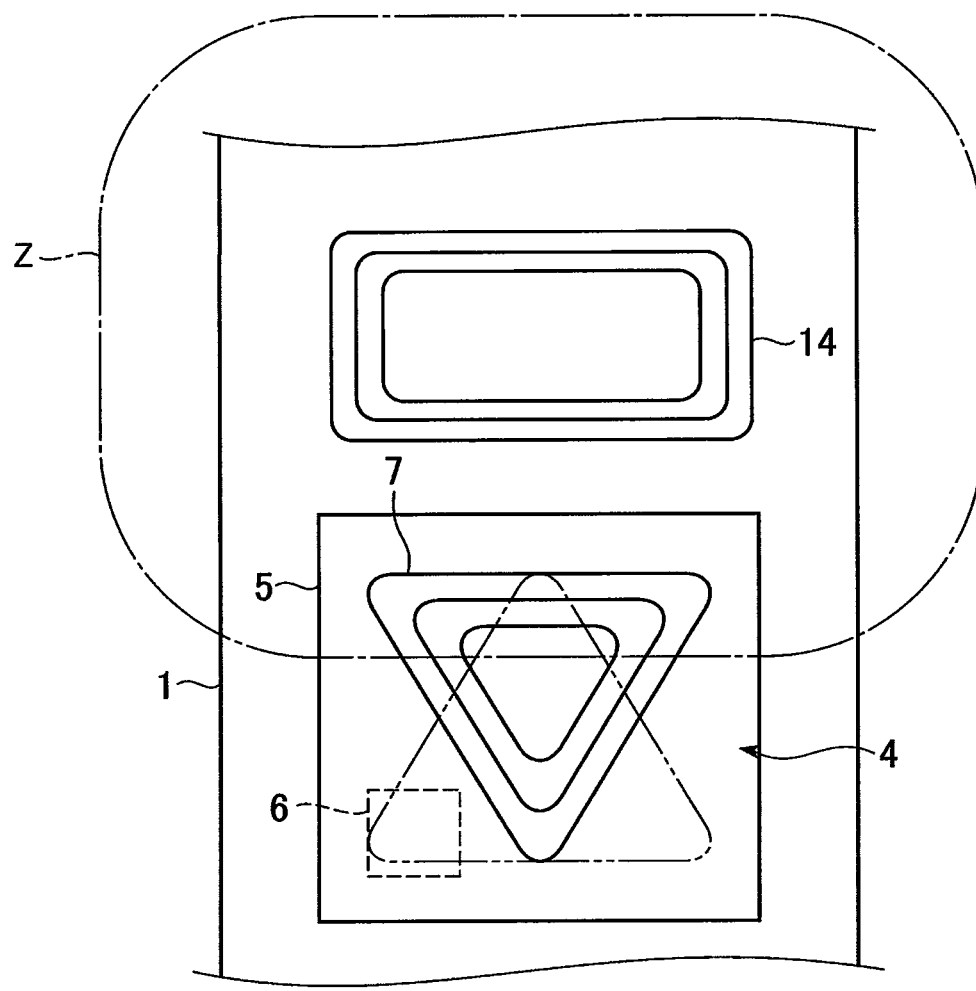
FIG. 10 is a plan view illustrating yet another embodiment of the IC tag side antenna coil.

Referring to FIG. 10, an IC tag 4 is disposed at the anteroposterior center of the upper wall of a work 1. In addition, an equilateral-triangular antenna coil 7 is disposed at the center of a square-shaped substrate 5 in such a manner as to be inverted. In this state the work 1 assumes the normal posture. In the case where the work 1 assumes the reverse posture, the antenna coil 7 is shaped like an equilateral-triangle not inverted as indicated with an imaginary line. If the work 1 assuming the normal posture is at a given communication position, an antenna 14 of a direction determining device 11 is arranged such that its long side portion is parallel to anterior and posterior side portions of the substrate 5. In addition, only the bottom side portion of the antenna coil 7 overlaps a communicable zone Z. In the state where the work 1 assumes the reverse posture, only the apex portion of the antenna coil 7 is inside the communicable zone Z. The normal or reverse of the posture of the work 1 can be detected from a difference in communication intensity between both the states.

Figure 11:
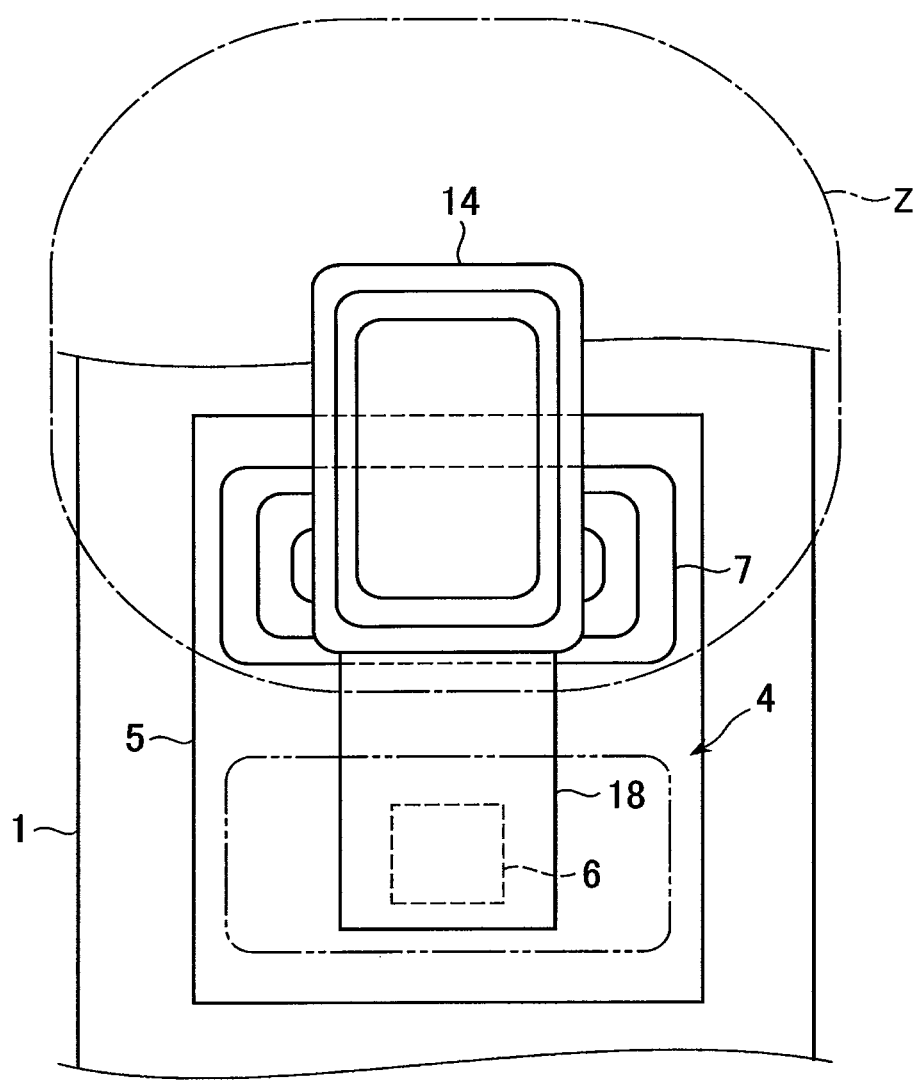
FIG. 11 is a plan view illustrating another embodiment of a direction determining device.
Figure 12:
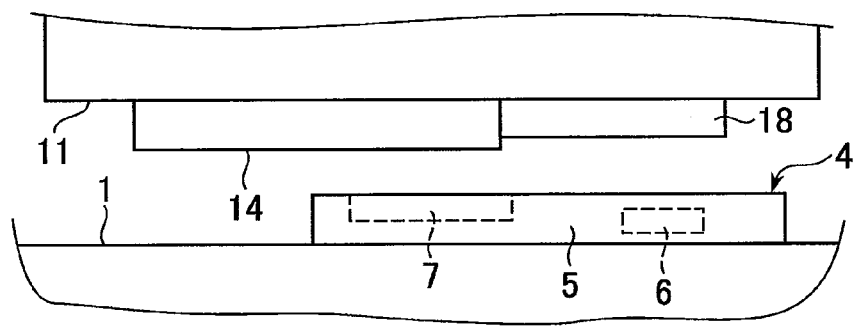
FIG. 12 is a lateral view of the direction determining device in FIG. 11.

Referring to FIGS. 11 and 12, a demagnetizing body 18 reducing leakage magnetic flux is disposed in front of and adjacently to an antenna 14 of a direction determining device 11. This reduces the coverage of a communicable carrier wave to a low level at a portion in front of the antenna 14. The demagnetizing body 18 is formed of a magnetic material represented by ferrite. As described above, a communicable zone Z of the antenna 14 is locally reduced. If a work 1 assuming the normal posture is at a given communication position, thus, the antenna 14 and a antenna coil 7 are brought closer to each other for reliable communication. If the work 1 assumes the reverse posture, the antenna coil 7 can surely be made to be located outside the communicable zone Z. In this way, the interval, i.e., size from the symmetric central axis to the antenna coil 7 between when the work 1 assumes the normal posture and when assumes the reverse posture can further be reduced.

Figure 13:
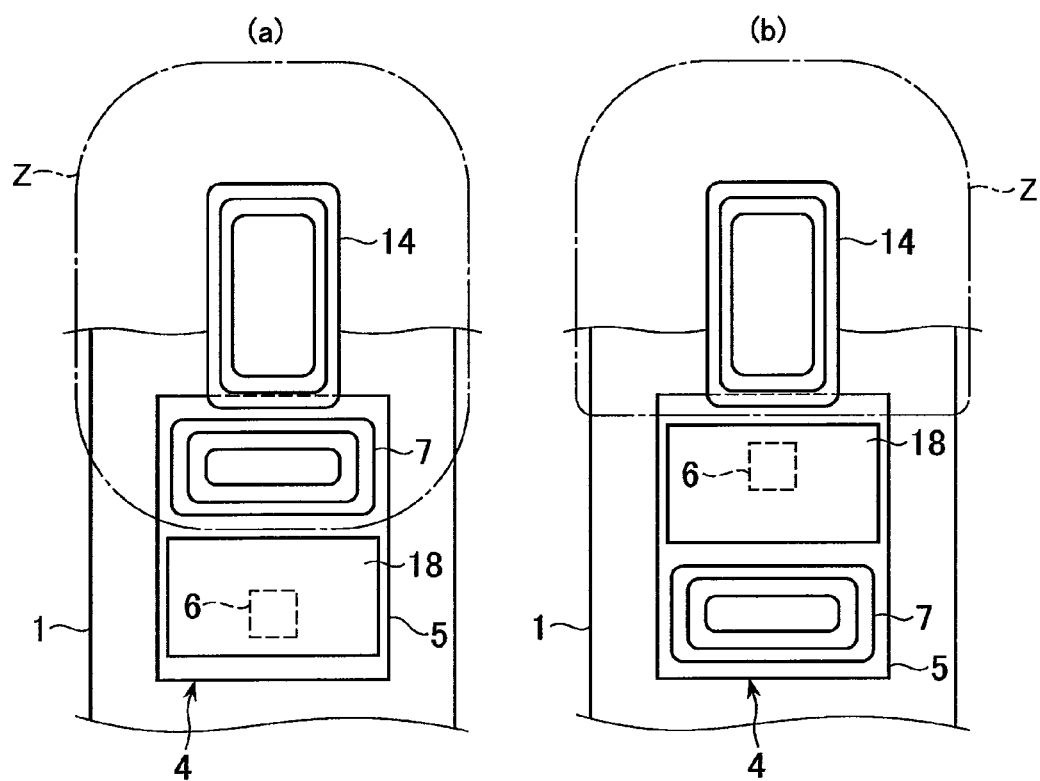
FIGS. 13(a) and 13(b) are plan views illustrating another embodiment of an IC tag.

The above-mentioned demagnetizing body 18 can be installed on the side of the IC tag 4 as illustrated in FIG. 13(a).

In such a case, if the work 1 assumes the normal posture, the antenna coil 7 is disposed at the rear portion of the substrate 5 and the demagnetizing body 18 is installed at the front portion of the substrate 5. In this way, if the work 1 assumes the reverse posture as illustrated in FIG. 13(b), the communicable zone Z of the antenna 14 is limited in the direction away from the antenna coil 7.

As clear from the above-description, the work direction determining method of the present invention can be embodied in the following modes.

A direction determining method aims to determine a work having a passive tag type IC tag secured at a predetermined position on the front surface thereof, the method allowing a direction determining device to determine a direction of the work, wherein the IC tag includes a substrate, an IC module, and an antenna coil, the IC module and the antenna coil being disposed on the substrate adjacently to each other; wherein the direction determining device includes an antenna communicating with the IC tag, and a determination circuit; and wherein in a state where the work and the direction determining device are located at respective predetermined communication positions, communication is performed between the antenna of the direction determining device and the antenna coil of the IC tag, and the magnitude of communication intensity during the communication is determined by the determination circuit to thereby determine a direction of the work.

In the work direction determining method described above, if the work located at the predetermined communication position assumes a normal posture, the antenna coil installed on the IC tag is located inside a communicable zone of the antenna of the direction determining device. If the work located at the predetermined position assumes a reverse posture, the antenna coil installed on the IC tag is located outside the communicable zone of the antenna of the direction determining device. Then, the presence or absence of the communication intensity, during the communication, of the work at the time of assuming the normal posture and of assuming the reverse posture is determined by the determination circuit to thereby determine a direction of the work.

In the work direction determining method described above, the direction determining device is configured by attaching the determination circuit to a tag reader. Communication is performed between an antenna of the tag reader and the antenna coil of the IC tag, and the magnitude of communication intensity during the communication is determined by the determination circuit to thereby determine a direction of the work.

In the work direction determining method described above, a group of the works, assuming a uniform posture, disposed adjacently to each other at predetermined intervals is transferred in one direction toward the direction determining device installed at a predetermined position. Then, each time the work reaches the predetermined communication position, communication is performed between the direction determining device and the IC tag provided on the work to continuously perform direction determination on the works.

A description is hereinafter given of test examples 1 to 5 performed to confirm the contents of the present invention.

TEST EXAMPLE 1

Figure 14:
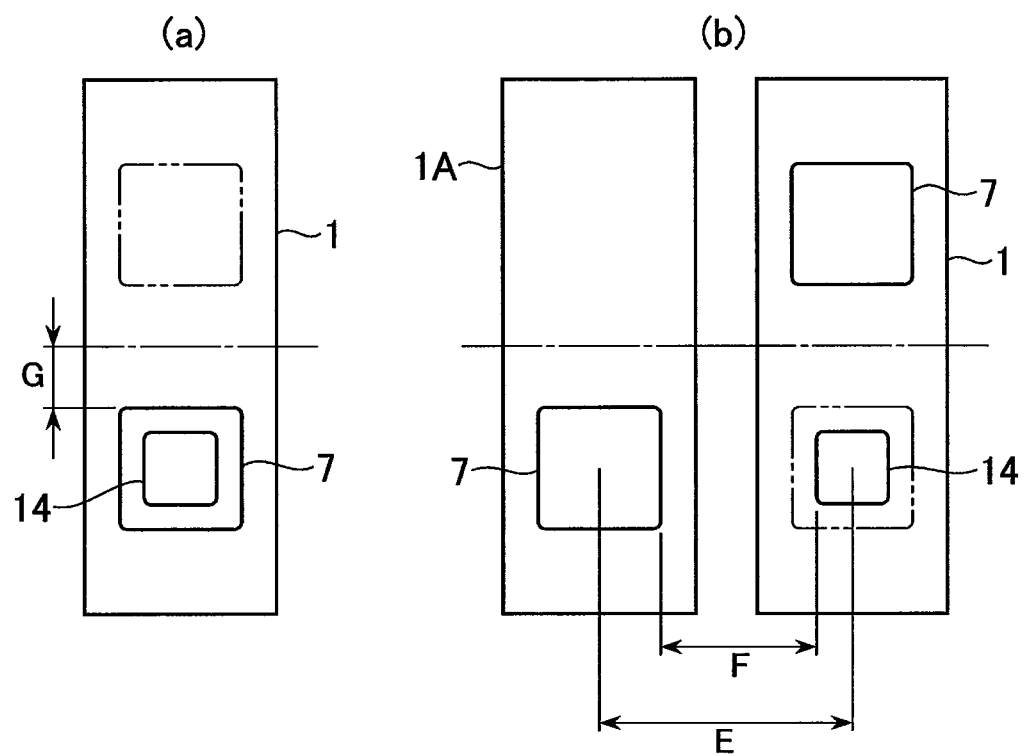
FIGS. 14(a) and 14(b) are plan views illustrating test formation of test example 1.

As illustrated in FIG. 14(a), a plastic test piece (work) 1 made of a rectangular parallelepiped having a height of 90 mm and a width of 30 mm was prepared. An antenna coil 7 of an IC tag was disposed at a position offset forward from the anteroposterior center of the upper surface of the test piece (this state is defined as a normal posture). The offset size G was 10 mm. Each of the anteroposterior size and left-right size of the outer circumference of the antenna coil 7 was 20 mm. The center of an antenna 14 on a tag reader side was located right above the center of the antenna coil 7 when the test piece 1 assumed the normal posture. Each of the anteroposterior size and left-right size of the outer circumference of the antenna 14 was 12 mm. An electric wave for communication had a frequency of 13.56 MHz. Although not illustrated, an IC module was buried in the test piece at a proper position.

Under the test conditions as described above, it was checked whether or not to be accessible to the antenna coil 7 in the state where the test piece 1 assumed the normal posture and in the state where the test piece 1 assumed the reverse posture. As a result, appropriate communication intensity could be obtained in the state where the test piece 1 assumed the normal posture. In the state where the test piece 1 assumed the reverse posture, access (communication) was impossible.

Further, as illustrated in FIG. 14(b), the test piece 1 assuming the reverse posture was located at a given communication position and another test piece 1A was adjacent to one side of the test piece 1. Then, the presence or absence of interference therebetween was confirmed. The adjacent test piece 1A assumed the normal posture. An interval E between the test piece 1 located at the predetermined communication position and the test piece 1A adjacent thereto was 40 mm. Incidentally, an interval F between the outermost circumference of the antenna coil 7 of the adjacent test piece 1A and the outermost circumference of an antenna 14 on a tag reader side was 24 mm. As a result, although the vertical distance between the antenna coil 7 and the antenna 14 was varied in a range from 0 to 50 mm, accessing to the adjacent test piece 1A was impossible in such a range.

TEST EXAMPLE 2

Figure 15:
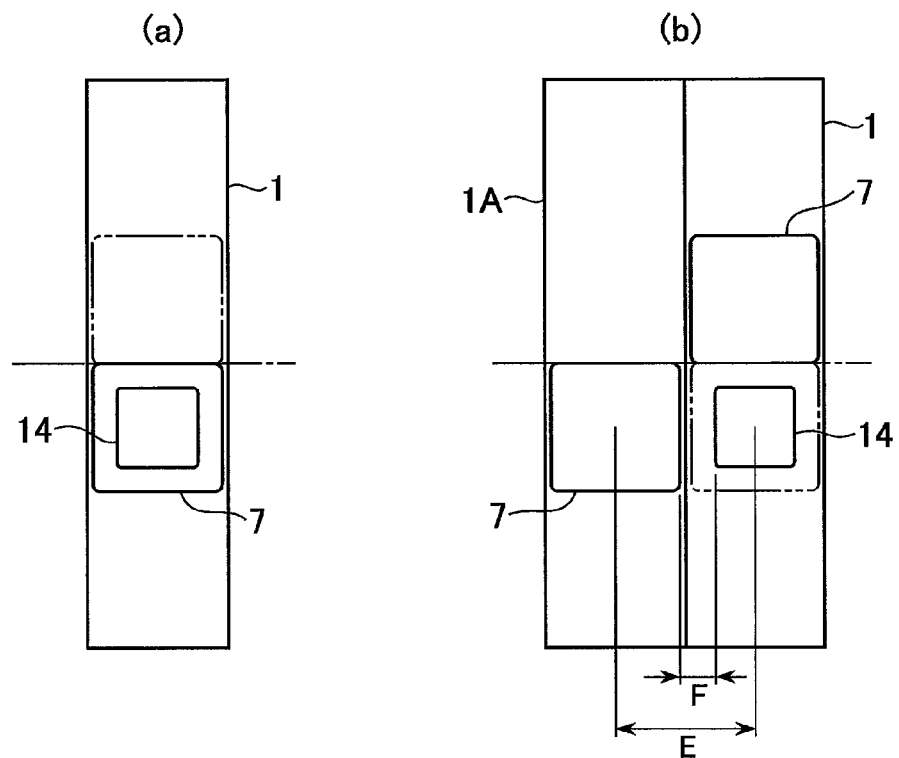
FIGS. 15(a) and 15(b) are plan views illustrating test formation of test example 2.

As illustrated in FIG. 15(a), a test piece 1 was made to have a height of 90 mm and a width of 20 mm, and an antenna coil 7 of an IC tag was disposed adjacently to the anteroposterior center of its upper surface. In addition, the outer-side portions of the coil 7 were located at the anteroposterior center of the test piece 1 (an offset size G was equal to 0 mm). While the other test conditions were made the same as those of the test piece 1, it was confirmed whether or not to be accessible to the antenna coil 7 in the state where the test example 1 assumed the normal posture and in the state where the test piece 1 assumed the reverse posture.

As a result, appropriate communication intensity could be obtained in the state where the test piece 1 assumed the normal posture. In this case, the maximum value of a vertical interval between the antenna coil 7 and an antenna 14 was varied in a range of 40 to 50 mm or below; however, the appropriate communication intensity could be obtained in any of these cases. In the state where the test piece 1 assumed the reverse posture, if the maximum value of the vertical interval between the antenna coil 7 and the antenna 14 is within a range of 20 to 30 mm, the appropriate communication intensity could be obtained, and access was thereby possible.

As illustrated in FIG. 15(b), the test piece 1 assuming the reverse posture was located at a predetermined communication position and another test piece 1A was made adjacent to one side of the test piece 1. Then, the presence or absence of interference therebetween was checked. The adjacent test piece 1A assumed the normal posture and an adjacent interval E between the adjacent test piece 1A and the test piece 1 located at the predetermined communication position was 20 mm. An adjacent interval F between the outermost circumference of the antenna coil 7 of the adjacent test piece 1A and the outermost circumference of the antenna 14 on the tag reader side was 4 mm. As a result, access to the adjacent test piece 1A was possible in a range where the maximum value of the vertical interval between the antenna coil 7 and the antenna 14 was 20 to 30 mm.

TEST EXAMPLE 3

Figure 16:
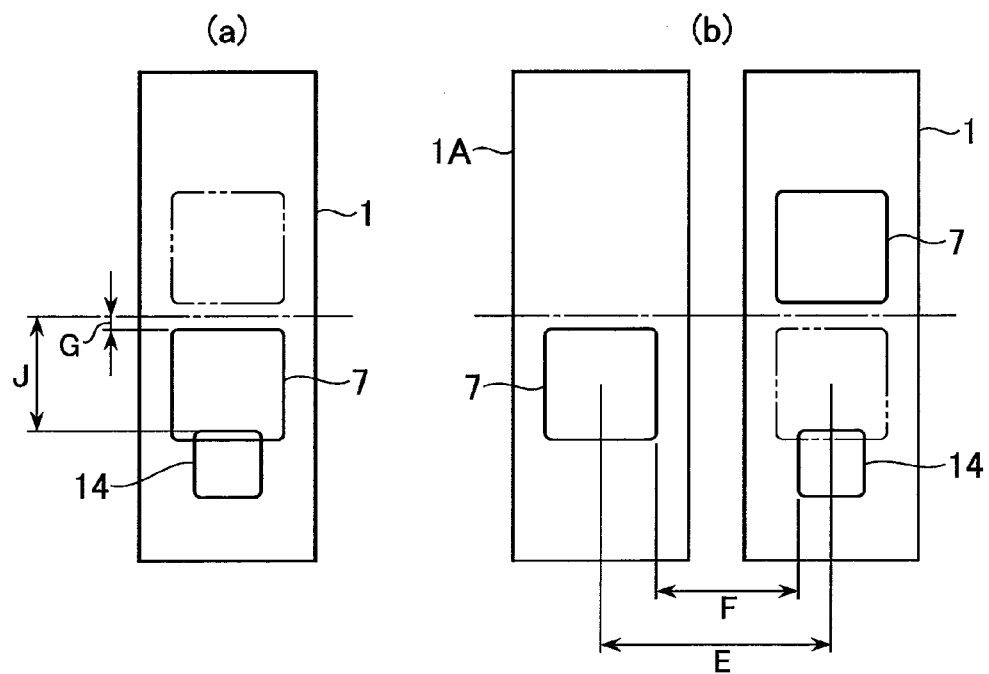
FIGS. 16(a) and 16(b) are plan views illustrating test formation of test example 3.

As illustrated in FIG. 16(a), a test piece 1 was made to have a height of 90 mm and a width of 30 mm and an antenna coil 7 of an IC tag was disposed at a position slightly offset forwardly from the anteroposterior center of the upper surface of the test piece 1. Its offset size G was 2.5 mm. An antenna 14 on a tag reader side was disposed at a position offset forwardly from the anteroposterior center of the test piece 1 assuming the normal posture. Its offset size J was 21.5 mm. The other test conditions were made the same as those of the test example 1. It was checked whether or not to be accessible to the antenna coil 7 in the state where the test piece 1 assumed the normal posture and in the state where the test piece 1 assumed the reverse posture.

As a result, appropriate communication intensity could be obtained in the state where the test piece 1 assumed the normal posture. In this case, the maximum value of the vertical interval between the antenna coil 7 and the antenna 14 was varied in a range from 30 to 40 mm or below. Appropriate communication intensity was obtained in any of these cases. In the state where the test piece 1 assumed the reverse posture, although the vertical interval between the antenna coil 7 and the antenna 14 was varied, i.e., increased and decreased, sufficient communication intensity could not be obtained, and access was thereby impossible.

As illustrated in FIG. 16(b), a test piece 1 assuming the reverse posture was located at a predetermined communication position and another test piece 1A was adjacent to one side of the test piece 1. Then, the presence or absence of the interference therebetween was checked. The adjacent test piece 1A assumed the normal posture. An adjacent interval E between the test piece 1 located at a predetermined communication position and the adjacent test piece 1A was 40 mm. An adjacent interval F between the outermost circumference of the antenna coil 7 of the adjacent test piece 1A and the outermost circumference of the antenna 14 on a tag reader side was 24 mm. As a result, although the vertical interval between the antenna coil 7 and the antenna 14 was varied, i.e., increased and decreased, access to the adjacent test piece 1A was impossible.

TEST EXAMPLE 4

Figure 17:
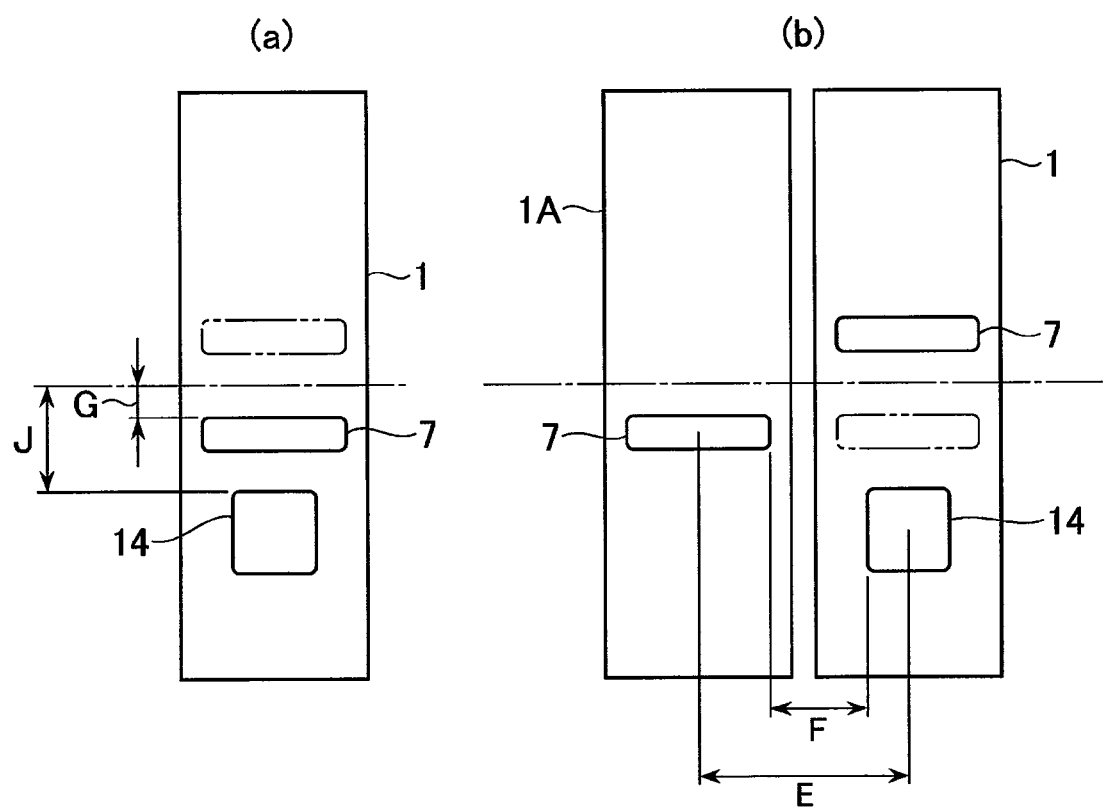
FIGS. 17(a) and 17(b) are plan views illustrating test formation of test example 4.

As illustrated in FIG. 17(a), a test piece 1 was made have a height of 90 mm and a width of 25 mm and an antenna coil 7 of an IC tag was disposed at a position slightly offset forwardly from the anteroposterior center of the upper surface of the test piece 1. The offset size G was 5 mm and the outer circumference of the antenna coil 7 was made to have an anteroposterior size of 5 mm and a right-left size of 20 mm. An antenna 14 on a tag reader side was disposed at a position offset forwardly from the anteroposterior center of the test piece 1 assuming the normal posture. Its offset size J was 16.5 mm. The other test conditions were made the same as those of the test example 1. It was checked whether or not to be accessible to the antenna coil 7 in the state where the test piece 1 assumed the normal posture and in the state where the test piece 1 assumed the reverse posture.

As a result, in the state where the test piece 1 assumed the normal posture, appropriate communication intensity could be obtained. In this case, the maximum value of the vertical interval between the antenna coil 7 and the antenna 14 was varied in a range from 20 to 30 mm or below. Appropriate communication intensity was obtained in any of these cases. In the state where the test piece 1 assumed the reverse posture, although the vertical interval between the antenna coil 7 and the antenna 14 was varied, i.e., increased and decreased, sufficient communication intensity could not be obtained and access was thereby impossible.

Further, as illustrated in FIG. 17(b), the test piece 1 assuming the reverse posture was located at a predetermined communication position and another test piece 1A was adjacent to one side thereof. In this case, the presence or absence of interference therebetween was checked. The adjacent test piece 1A assumed the normal posture and an adjacent interval E between the adjacent test piece 1A and the test piece 1 located at the predetermined communication position was 30 mm. An adjacent interval F between the outermost circumference of the antenna coil 7 of the adjacent test piece 1A and the outermost circumference of the tag reader side antenna 14 was 14 mm. As a result, although the vertical interval between the antenna coil 7 and the antenna 14 was varied, i.e., increased and decreased, access to the adjacent test piece 1A was possible.

TEST EXAMPLE 5

A distribution of communicable distances between the antenna 14 and the test piece 1 side antenna coil 7 was determined under the same test conditions as those of test example 1 by use of the antenna 14 of the tag reader used in test example 4. Specifically, as illustrated in FIG. 18, if the center of the antenna coil 7 has coordinates (X=0, Y=0), it is checked how deviations of an X-coordinate and a Y-coordinate of the center of the antenna 14 and a deviation of a vertical interval (Z-coordinate) between the antenna coil 7 and the antenna 14 have an influence on access.

Symbol A in the figure indicates the case where the coordinates of the center of the antenna 14 coincide with those of the antenna coil 7. In this case, appropriate access is possible in a range where the maximum value of the Z-coordinate is 40 to 50 mm or below.

Symbol B indicates the case where the center of the antenna 14 has coordinates (X=30, Y=20). In this case, appropriate access is possible in a range where the maximum value of the Z-coordinate is 0 to 10 mm or below.

Symbol C indicates the case where the center of the antenna 14 has coordinates (X=0, Y=40). In this case, access is impossible although the Z-coordinate is made equal to 0.

Symbol D indicates the case where the center of the antenna 14 has coordinates (X=−20, Y=−25). In this case, appropriate access is possible in a range where the maximum value of the Z-coordinate is 10 to 20 mm or below.

The above results mean the following and it is found that the greater the Z-coordinate, the smaller the communicable area.

In the case where the Z-coordinate is 0 to 10 mm, if the coordinates of the center of the antenna 14 are within a range where the radius from the coordinates (X=0, Y=0) of the center of the antenna coil 7 is approximately 28 mm, it is possible to surely access the antenna coil 7 of the test piece 1.

In the case where the Z-coordinate is 10 to 20 mm, if the coordinates of the center of the antenna 14 are within a range where the radius from the coordinates (X=0, Y=0) of the center of the antenna coil 7 is approximately 20 mm, it is possible to surely access the antenna coil 7 of the test piece 1.

In the case where the Z-coordinate is 20 to 30 mm, if the coordinates of the center of the antenna 14 are within a range where the radius from the coordinates (X=0, Y=0) of the center of the antenna coil 7 is approximately 15 mm, it is possible to surely access the antenna coil 7 of the test piece 1.

In the case where the Z-coordinate is 30 to 40 mm, if the coordinates of the center of the antenna 14 are within a range where the radius from the coordinates (X=0, Y=0) of the center of the antenna coil 7 is approximately 10 mm, it is possible to surely access the antenna coil 7 of the test piece 1.

In the case where the Z-coordinate is 40 to 50 mm, if the coordinates of the center of the antenna 14 are immediately above the coordinates (X=0, Y=0) of the center of the antenna coil 7, it is possible to surely access the antenna coil 7 of the test piece 1.

The following is confirmed by the above test examples. In the state where the work 1 and the direction determining device 11 are located at the respective predetermined communication positions, communication is done between the antenna 14 of the direction determining device 11 and the antenna coil 7 of the IC tag 4. The magnitude of the communication intensity during the communication can be determined by the determination circuit 15 to determine the direction of the work 1.

In addition to the embodiments described above, the IC tag 4 can be disposed on the anteroposteriorly circumferential faces or left-right circumferential faces of the work 1. The IC tag 4 can be disposed on the bottom side of the work 1 if necessary. The work 1 need not be a reservoir capable of individually storing the two liquids described in the embodiments. The work 1 may be one having an anteroposteriorly symmetric shape or having a left-right symmetric shape. The antenna 14 can be formed in a circle, a triangle or an arbitrary geometric configuration. In short, the shape of the antenna 14 needs only to be selected based on the relationship with the shape of the antenna coil 7. In the embodiments described above, the direction determining device 11 is configured by use of the tag reader; however, this is not necessary. The direction of the work 1 can be determined by the provision of a dedicated direction determining device 11 different from the tag reader.

When the direction of the work 1 is to be determined while transferring the work 1, the work 1 is not necessarily intermittently transferred. The direction of the work 1 may be determined while continuously transferring the work 1. In such a case, a display body adjacent to the work 1 determined to assume the reverse posture can be made to flicker. Alternatively, the work 1 determined to assume the reverse posture can be rejected from a transfer path. A transfer trajectory of the work 1 need not be linear. The transfer trajectory may be circular, arcuate, or S-shaped. The transfer of the work 1 is not necessarily laterally done as described in the embodiments. The transfer of the work 1 may be done longitudinally or obliquely. The antenna coil 7 need not be exposed to the surface of the substrate 5. However, the antenna coil 7 may be exposed to the surface of the substrate 5 if necessary.

DESCRIPTION OF THE REFERENCE NUMERALS

1 Work
4 IC tag
5 Substrate
6 IC module

7 Antenna coil
11 Direction determining device
14 Antenna
15 Determination circuit

The invention claimed is:

1. A work provided with a direction determining function, communicating with a direction determining device at a predetermined communication position and determined by the direction determining device as to whether to assume a normal posture or a reverse posture,
- wherein the direction determining device includes an antenna communicating with an IC tag, and a determination circuit determining the magnitude of communication intensity during the communication;
- wherein the IC tag capable of communicating with the direction determining device is secured to an upper surface of the work at a predetermined position;
- wherein the IC tag is configured as a passive tag type including a substrate, an IC module and an antenna coil, the IC module and the antenna coil being disposed on the substrate adjacent to each other;
- wherein the antenna coil is disposed on the substrate in an offset manner so that a communication distance between the antenna coil and a communicable zone of the antenna of the direction determining device is different in magnitude on the basis of a difference in the posture of the work at the predetermined communication position;
- wherein the work is shaped as a rectangular parallelepiped and is provided with two compartments;
- wherein respective mouths of the two compartments are opened in an upper surface of the work at anteroposteriorly symmetrical positions and the IC tag is disposed between the mouths; and
- wherein the antenna coil is disposed in an offset manner on one of front and rear sides of the substrate constituting the IC tag, and the IC module is disposed on the other side.

2. The work provided with the direction determining function, according to claim 1,
- wherein the antenna coil is disposed on one side of the substrate in an offset manner so that the whole of the antenna coil installed on the IC tag is located inside the communicable zone of the antenna of the direction determining device only when the work located at the predetermined communication position assumes a normal posture.

3. The work provided with the direction determining function, according to claim 1,
- wherein an arrangement pattern of the antenna coil installed on the IC tag is formed in a non-rectangle; and
- wherein the antenna coil is disposed on the substrate so that an overlapping area between the communicable zone of the antenna of the direction determining device and the antenna coil may be different in magnitude between when the work located at the predetermined communication position assumes a normal posture and when assumes a reverse posture.

4. The work provided with the direction determining function, according to claim 1,
- wherein a demagnetizing body made of a magnetic material and reducing a leakage magnetic flux of the antenna is disposed adjacently to the antenna coil of the IC tag.

5. The work provided with the direction determining function, according to claim 1,
- wherein, the compartments are configured to be filled with liquid directly without an intervening liquid holding container between the liquid and a surface of the compartments, and
- wherein, the antenna coil is disposed on an upper surface of the substrate of the IC tag.

* * * * *